US012807130B2

(12) United States Patent
Khadiya

(10) Patent No.: US 12,807,130 B2
(45) Date of Patent: Nov. 24, 2026

(54) IDLE-AVOIDANCE SYSTEM FOR WORK VEHICLE AND ENGINE SYSTEM USING SAME

(71) Applicant: Deere & Company, Moline, IL (US)

(72) Inventor: Navin Khadiya, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 291 days.

(21) Appl. No.: 18/655,746

(22) Filed: May 6, 2024

(65) Prior Publication Data

US 2025/0340198 A1 Nov. 6, 2025

(51) Int. Cl.
*B60W 20/15* (2016.01)
*B60L 58/12* (2019.01)
(Continued)

(52) U.S. Cl.
CPC ............. *B60W 20/20* (2013.01); *B60L 58/12* (2019.02); *B60W 10/26* (2013.01); *B60W 10/30* (2013.01);
(Continued)

(58) Field of Classification Search
CPC ....... B60L 58/12; B60W 20/13; B60W 20/16; B60W 20/20; B60W 30/18054;
(Continued)

(56) References Cited

U.S. PATENT DOCUMENTS

2005/0001606 A1* 1/2005 Kagoshima ........... F15B 21/087 903/917
2007/0124037 A1* 5/2007 Moran .................. B60W 10/06 701/22
2015/0159613 A1* 6/2015 Jensen ............. B60W 30/18118 701/68

FOREIGN PATENT DOCUMENTS

| | | | |
|---|---|---|---|
| EP | 2781721 | B1 | 9/2014 |
| KR | 20130037473 | A | 4/2013 |
| RU | 2703363 | C1 | 10/2019 |

OTHER PUBLICATIONS

Therma-Start, Off-Highway Idle Reduction, Thermex Engineered Systems Inc., https://thermex-systems.com/idle-reduction-systems/therma-start-off-highway/, accessed Feb. 22, 2024. (3 pages).

* cited by examiner

*Primary Examiner* — Tinh T Dang
(74) *Attorney, Agent, or Firm* — KLINTWORTH & ROZENBLAT LLP

(57) ABSTRACT

An idle-avoidance system for a work vehicle having an engine and one or more work components includes an electric machine coupled to and driven by the engine and a battery coupled to the engine, the electric machine, and the one or more work components. The idle-avoidance system further includes a controller having a processing and memory architecture. The controller is configured to execute instructions to determine whether the engine is in an idling state and in response estimate a power demand associated with energizing at least one of the one or more work components to an operational state, monitor a state of charge of the battery, terminate operation of the engine when the state of charge of the battery is sufficient to meet the estimated power demand, and activate ignition of the engine and operation of the electric machine in a power generation mode to charge the battery when the state of charge of the battery is not sufficient to meet the estimated power demand.

16 Claims, 8 Drawing Sheets

(51) Int. Cl.

| | |
|---|---|
| ***B60W 10/26*** | (2006.01) |
| ***B60W 10/30*** | (2006.01) |
| ***B60W 20/13*** | (2016.01) |
| ***B60W 20/16*** | (2016.01) |
| ***B60W 20/20*** | (2016.01) |
| ***B60W 30/18*** | (2012.01) |

(52) U.S. Cl.
CPC ....... *B60W 20/13* (2016.01); *B60W 2300/152* (2013.01); *B60W 2510/0642* (2013.01); *B60W 2510/08* (2013.01); *B60W 2510/305* (2013.01); *B60W 2710/0638* (2013.01); *B60W 2710/08* (2013.01); *B60W 2710/244* (2013.01); *B60W 2710/30* (2013.01); *B60Y 2200/22* (2013.01); *B60Y 2200/41* (2013.01)

(58) Field of Classification Search
CPC ... B60W 2510/0642; B60W 2510/068; B60W 2510/08; B60W 2510/244; B60W 2510/305; B60W 2300/152; B60W 2710/0638; B60W 2710/0694; B60W 2710/08; B60W 2710/244; B60W 2710/30; B60W 10/26; B60W 10/30
See application file for complete search history.

IDLE-AVOIDANCE SYSTEM FOR WORK VEHICLE AND ENGINE SYSTEM USING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to internal combustion engine systems for work vehicles and engine idle management for work vehicles.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and to operate one or more work implements installed on the work vehicle including, for example, a harvest header, a bucket, a boom, a sprayer, a blade, and the like. Internal combustion engines, including various compression ignition engines (such as diesel engines), combust fuel to generate power for tractive and work operations of these work vehicles and devices. There may be periods during operation of the work vehicle when the work vehicle is not being moved and/or when the work implements are not being operated, for example, if the work vehicle must wait for completion of another operation by another work vehicle, for space in which the work vehicle is to be operated to be accessible, for the operator to be ready to operate the work vehicle and/or work implements thereof, and the like. One or more work components (a hydraulic, pneumatic, or fluid pump, a wheel drive unit, and the like) that enable operation of the work implement may be kept energized during such periods so that the work implement is operable when needed by the operator without incurring a delay to energize such work components.

SUMMARY OF THE DISCLOSURE

The disclosure provides an idle-avoidance system for a work vehicle having an engine and one or more work components. The idle-avoidance system includes an electric machine coupled to and driven by the engine, a battery, and a controller having a processing and memory architecture. The battery is coupled to the engine, the electric machine, and the one or more work components. The controller is configured to execute instructions to determine whether the engine is in an idling state and, in response, estimate a power demand associated with energizing at least one of the one or more work components to an operational state, monitor a state of charge of the battery, terminate operation of the engine when the state of charge of the battery is sufficient to meet the estimated power demand, and activate ignition of the engine and operation of the electric machine in a power generation mode to charge the battery when the state of charge of the battery is not sufficient to meet the estimated power demand.

The present disclosure also provides an engine system for a work vehicle having one or more work components that include an engine, an electric machine coupled to and driven by the engine, and a battery coupled to the engine, the electric machine, and the one or more work components. The engine system further includes an idle-avoidance system that includes a controller having a processing and memory architecture and configured to execute instructions to determine whether the engine is in an idling state and in response estimate a power demand associated with energizing at least one of the one or more work components to an operational state, monitor a state of charge of the battery, terminate operation of the engine when the state of charge of the battery is sufficient to meet the estimated power demand, and activate ignition of the engine and operation of the electric machine in a power generation mode to charge the battery when the state of charge of the battery is not sufficient to meet the estimated power demand.

In some aspects or embodiments, the engine is a compression ignition engine.

In other aspects or embodiments, the at least one of the one or more work components is mechanically coupled to the engine and electrically coupled to the battery and is energized to the operational state mechanically by the operation of the engine when the engine is activated and electrically by the battery when the operation of the engine is terminated.

In other aspects or embodiments, the battery supplies power to energize the at least one of the one or more work components to the operational state while the engine drives the electric machine to charge the battery.

In other aspects or embodiments, the work vehicle further includes an electric turbo driven by exhaust generated by operation of the engine, wherein the controller causes the electric turbo to operate in a power generation mode to charge the battery while the engine is activated. Further, in some cases, the controller determines the engine has transitioned from the idling state to a non-idling state, and in response causes the electric turbo to operate in a battery power consumption mode to spool up the electric turbo and thereby provide compressed air to the engine.

In other aspects or embodiments, the work vehicle includes an aftertreatment system having a catalyst, an electrically powered heater, and a temperature sensor that develops an indication of a temperature of the catalyst, and the controller monitors the indication of the temperature while the operation of the engine is terminated and powers the heater using power from the battery if the indication is less than a predetermined temperature and the state of charge of the battery is sufficient to power the heater.

In some aspects or embodiments, the controller activates ignition of the engine and operates the engine to generate heated exhaust gases that heat the catalyst if the indication is less than the predetermined temperature and the state of charge of the battery is not sufficient to power the heater.

In some aspects or embodiments, the controller determines the engine has transitioned from the idling state to a non-idling state and in response causes the engine to drive the electric machine to provide electric power to the at least one of the one or more work components.

In some aspects or embodiments, the controller determines that electric power generated by the electric machine exceeds a power demand of the at least one of the one or more work components and directs excess electric power generated by the electric machine to charge the battery.

BRIEF DESCRIPTION OF THE DRAWINGS

Like reference symbols in the various drawings indicate like elements.

DETAILED DESCRIPTION

Figure 1:
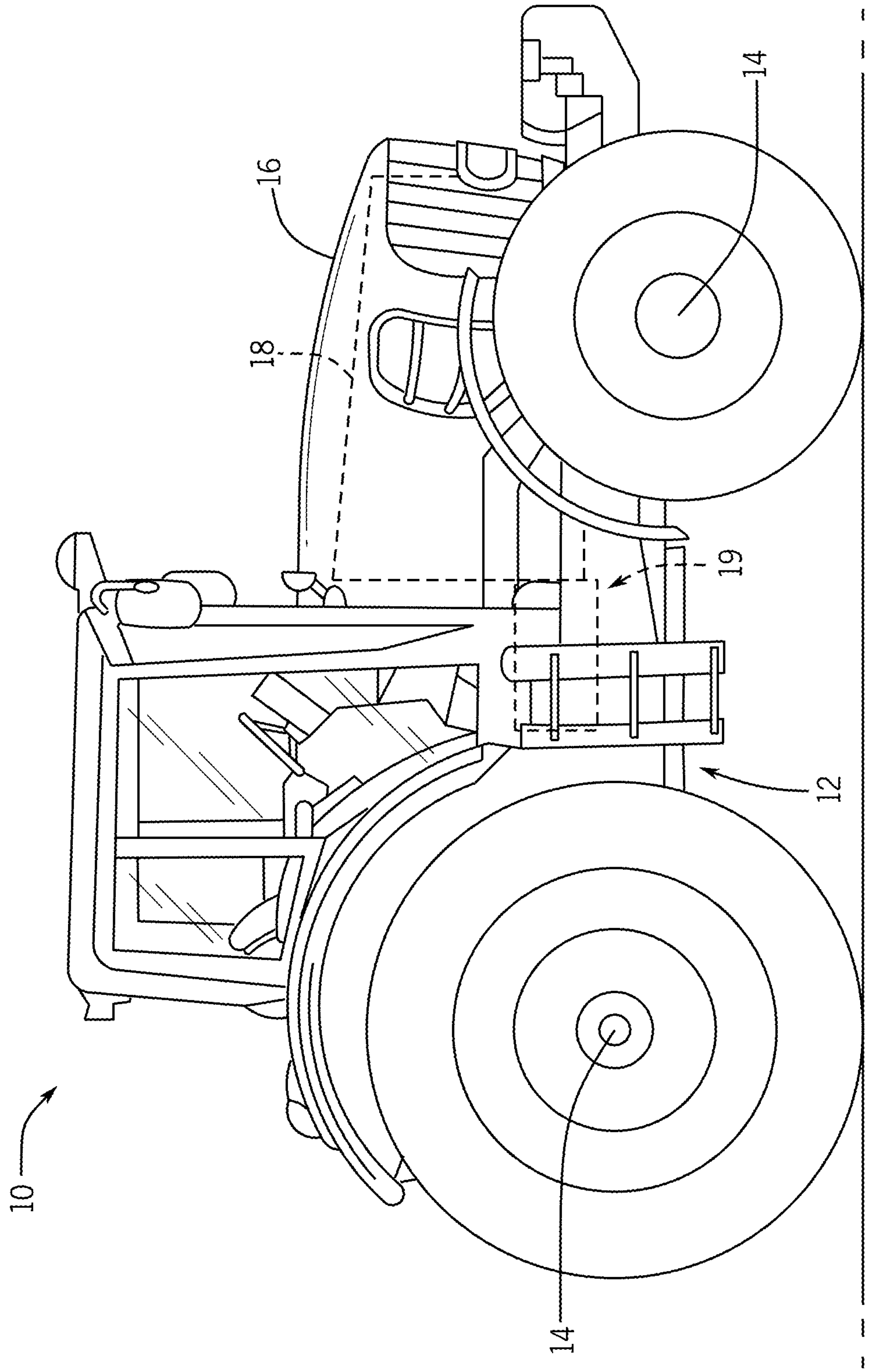
FIG. 1 is an example work vehicle in the form of an agricultural tractor in which the idle-avoidance system of the present disclosure may be incorporated.

The following describes one or more example embodiments of the disclosed idle-avoidance system and engine system for a work vehicle as shown in the accompanying figures of the drawings described briefly above. Various modifications to the example embodiments may be contemplated by one of skill in the art. Discussion herein focuses on the idle-avoidance system and engine system being for a work vehicle, such as an agricultural tractor, but the idle-avoidance system and engine system disclosed herein may be utilized in other contexts, including other work vehicle platforms in the agriculture, construction, forestry, mining, and other industries.

Overview

A work vehicle includes an engine system and one or more work implements such as, for example, a harvest header, a bucket, a boom, a sprayer, a blade, and the like. Operation of the work implement to perform work is enabled by one or more work components such as a pneumatic or hydraulic system, one or more pumps and/or fluid sources, and the like. Fuel is combusted by the engine system to generate power necessary to undertake various work operations of the work vehicle such as to generate traction to move the work vehicle, transport a load carried by the work vehicle, and to operate work implements of the vehicle. Some work components associated with a work implement may be powered mechanically by operation of the engine system when the engine is operating and may be powered using electric power generated by a battery when the operation of the engine has been terminated. Other work components may be powered electrically by the battery when the engine is operating and when operation of the engine has been terminated. The one or more work components available in the work vehicle are energized to an operational state even when not being used or operated during a time period when the work vehicle is turned on (i.e., time period between when an operator turns on the work vehicle and the operator turns off the work vehicle). One or more work components of the work vehicle are kept energized in an operational state so the operator may operate one or more work implements of the work vehicle on demand without a delay that may be incurred to energize the one or more work components. For example, if a work implement uses a pneumatic or hydraulic system for operation, one or more pumps and/or fluid sources may of such system may be energized even when the work vehicle and implement are not being used so the work implement is operable on demand. Similarly, if a sprayer of a material requires a source of such material to be pressurized, one or more pressurizing devices may need to be energized to maintain the sprayer in the operational state even when the sprayer is not discharging any material. In this manner, the one or more work components can be operated as needed without requiring any time to pressurize the pneumatic or hydraulic system and/or the pressurizing device.

Further, the work vehicle includes an aftertreatment system that filters the particulates in exhaust gases and breaks down hazardous components of the exhaust gases generated by the engine system into more inert gases such as carbon dioxide, water vapor, and nitrogen. The aftertreatment system includes a catalyst that while activated facilitates a reduction reaction among the gases that are generated by engine system and passed through the aftertreatment system to convert hazardous components of such gases into less hazardous materials that may be emitted from the work vehicle. Activation of the catalyst requires the catalyst to be heated to a predetermined activation temperature. For optimal conversion of the exhaust gases, once a catalyst used in the aftertreatment system is activated by raising the temperature of the catalyst to the predetermined activation temperature, the temperature of such catalyst must be kept at or above a predetermined minimum temperature for the catalyst to remain active. If the temperature of such catalyst drops below such predetermined minimum temperature, the effectiveness of the aftertreatment system to convert exhaust gases lessens and such conversion May even cease if the temperature of the catalyst is too low. To reactivate the catalyst, the temperature of the catalyst must be raised once again to at least the activation temperature. Thus, even when the work vehicle is not moving and the one or more work components thereof are not being operated, the temperature of the catalyst is maintained at or above the predetermined minimum temperature so the aftertreatment system can effectively convert harmful components of the exhaust gases when the work vehicle is moved or a work component can be operated without a delay that May otherwise be necessary to reactivate the catalyst.

In some situations, there may be periods of time while the work vehicle is turned on that the engine thereof is operating but power generated by the engine is not being used to move the work vehicle or operate (i.e., move or manipulate) any work implement. That is, the engine is operating in an idling state. However, as would be apparent to one having ordinary skill in the art, idling the engine in this manner consumes fuel and generates excess exhaust gases. Consumer vehicles (i.e., non-work vehicles) that use a spark ignited engine may shut down the engine when the consumer vehicle is not moving to conserve fuel and prevent generation of exhaust gases. However, simply terminating operation of the engine of the work vehicle when the work vehicle is not moving or any work implement is not being operated may not be feasible because of the need to energize the one or more work components of the work vehicle to the operational state and to maintain the temperature of the catalyst of the aftertreatment system to avoid a delay when the engine is transitioned from the idling state to a non-idling state.

A work vehicle is described below that includes an idle-avoidance system that manages idling of the engine when the work vehicle and one or more work implements thereof are not being operated while ensuring that work components associated with such work implements are energized to the operational state and the temperature of catalyst of the aftertreatment system is maintained at least at the predetermined minimum temperature.

The idle-avoidance system determines when the engine is idling and in response estimates the power demand necessary to energize the one or more work components in the operational state. If a battery of the idle-avoidance system has sufficient charge to supply such power demand, the idle-avoidance system terminates operation of the engine and energizes the one or more work components using battery power. The idle-avoidance system continues to monitor the state of charge of the battery while the work vehicle and work implements thereof are not being operated. The idle-avoidance system activates ignition of the engine if the state of charge of the battery becomes sufficiently depleted that the battery cannot provide sufficient electric power to energize the one or more work components to the operational state and/or or operate a catalyst heater used to heat the catalyst of the aftertreatment system.

After ignition of the engine, the engine is operated in the idling state to drive an electric machine coupled thereto in a power generation mode to charge the battery while the battery supplies electric power to energize the one or more work components. In some cases, the electric machine generates electric power to directly energize the one or more work components and any excess electric power generated by the electric machine charges the battery. In yet other cases, the engine is idled to directly energize the one or more work components that can be energized mechanically by the engine, drive the electric machine to generate power to energize those work components that can be energized only electrically, and charge the battery.

The electric machine is an electromagnetic power generation device that includes an electric rotor mechanically coupled to and driven by operation of the engine to generate electric power that may be used to energize the one or more work components and/or charge the battery. Electric power generated by the electric machine in excess of that needed to energize the one or more work components is used to charge the battery. While the engine is idling, the idle-avoidance system continues to monitor the state of charge of the battery and once the battery has sufficient charge to meet the power demand necessary to energize the work component of the work vehicle and heat the catalyst of the aftertreatment system, the idle-avoidance system terminates operation of the engine.

In some embodiments, the work vehicle includes an electric turbo in addition to the electric machine described above. The electric turbo is another power generation device that includes a turbine that may be driven by the flow of exhaust gases generated by the engine and also by electric power supplied by the battery. Rotation of the turbine causes rotation of an electric rotor to generate electric power. The idle avoidance system may operate the electric turbo in a power generation mode to charge the battery while the engine is idling and generating exhaust gases. In some cases, the idle-avoidance system operates both the electric turbo and the electric machine in the power generation mode so that electric power generated by the electric turbo charges the battery and electric power generated by the electric machine energizes the one or more work components to the operational state. In some cases, when the engine is idling, the idle-avoidance system may simultaneously operate both the electric turbo and the electric machine to generate electric power to charge the battery and energize the one or more work components to the operational state using electric power from the battery.

The idle-avoidance system monitors the temperature of the catalyst of the aftertreatment system while operation of the engine is terminated to ensure that such temperature is greater than the predetermined minimum temperature. Thus, the catalyst remains activated to facilitate conversion of the exhaust gases without delay when the engine is re-ignited. To maintain activation of the catalyst, if the temperature of the catalyst drops below a predetermined temperature between the predetermined activation and minimum temperatures noted above, the idle-avoidance system operates a catalyst heater if the battery has sufficient charge. If the battery does not have sufficient charge, the idle avoidance system operates the engine to generate heated exhaust gases to raise the temperature of the catalyst. To facilitate rapid heating of the catalyst, the idle avoidance system may direct an engine control unit to operate air intake throttle valves and/or exhaust throttle valves to cause the engine to generated heated exhaust gases. Further, the idle-avoidance system causes the engine to drive the electric machine and/or the electric turbo as described above to charge the battery. The idle-avoidance system continues to monitor the state of charge of the battery and the temperature of the catalyst and terminates operation of the engine once the battery has sufficient charge to operate the catalyst heater or the temperature of catalyst is raised sufficiently to maintain conversion of the exhaust gases.

These and further aspects of the disclosed idle-avoidance control system will be better understood with regard to the one or more examples described hereinafter.

Example Idle-Avoidance System

Referring to FIG. 1, a work vehicle 10 is shown that can implement embodiments of the disclosure. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle platforms. The work vehicle 10 includes a chassis or frame 12 carried on front and rear wheels 14. Positioned on a forward end region of the chassis 12 is an engine housing 16 within which is located an engine system 18. The engine system 18 provides power via an associated powertrain 19 to an output member (e.g., an output shaft, not shown) that, in turn, transmits power to axle(s) of the work vehicle 10 to provide propulsion thereto and/or to a power take-off shaft for powering an implement on or associated with the work vehicle 10, and/or one or more work components 20 (FIG. 2) associated with the implement, for example.

Figure 2:
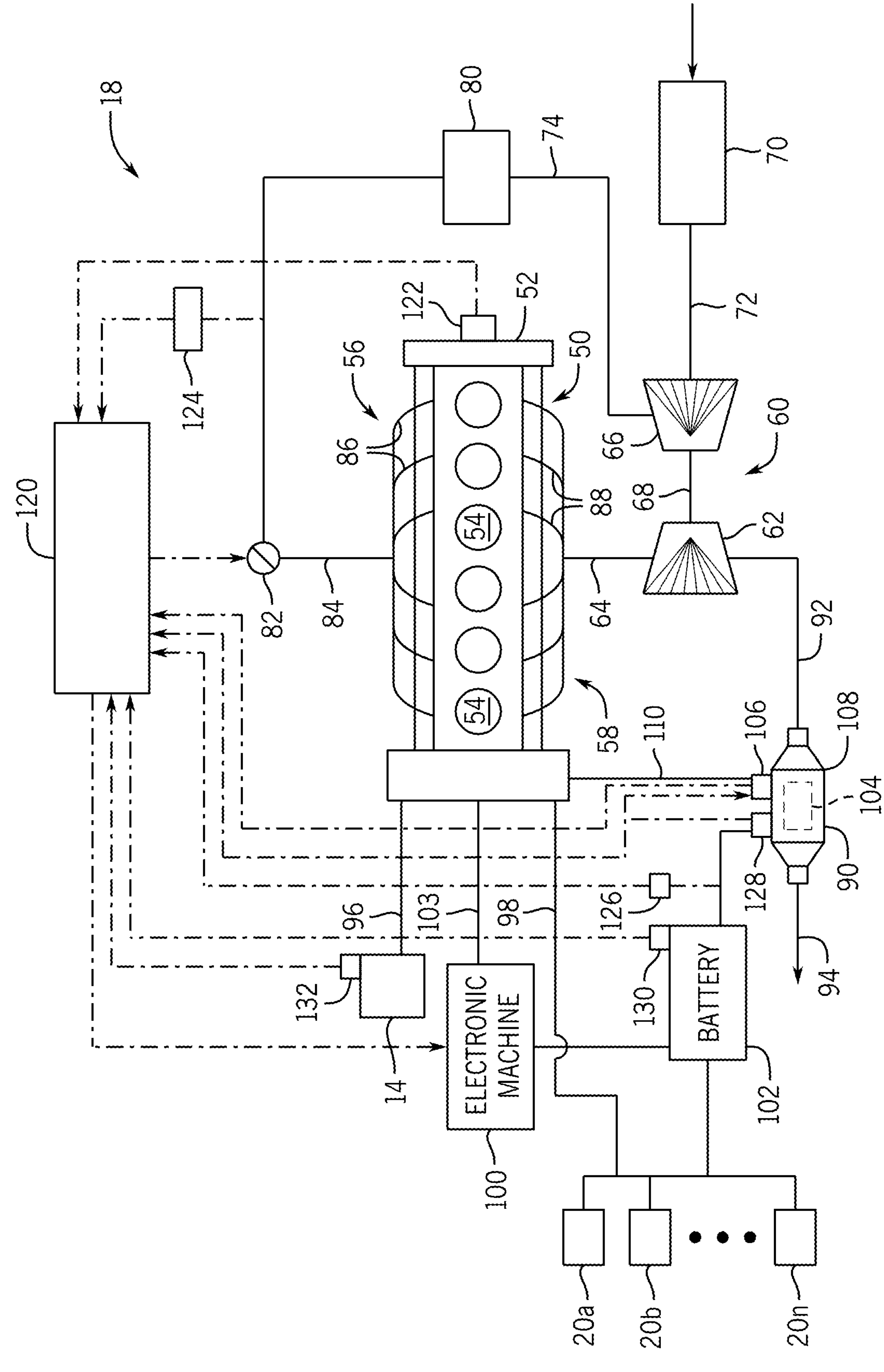
FIG. 2 is a schematic diagram of an example engine system of the work vehicle of FIG. 1.

The engine system 18 is illustrated in greater detail in FIG. 2 in accordance with an example implementation. Referring to FIG. 2, the engine system 18 includes an internal combustion engine 50 (hereafter, "engine") that, in different embodiments, may be a compression-or spark-ignition internal combustion engine. The engine 50 of the engine system 18 includes an engine block 52 having a plurality of piston-cylinder arrangements 54 that operate to cause combustion events. In the illustrated implementation, the engine 50 is an inline-6 (1-6) compression ignition (e.g., diesel) engine defining six piston-cylinder arrangements 54; however, in alternative implementations various engine styles and layouts may be used.

The engine system 18 also includes an intake manifold 56 fluidly connected to the engine 50, an exhaust manifold 58 fluidly connected to the engine 50, and a turbocharger assembly 60. The turbocharger assembly 60 includes a turbine 62 fluidly connected to the exhaust manifold 58 by an exhaust gas passageway 64 and a compressor 66 mechanically coupled to the turbine 62 via a first rotatable shaft 68. The compressor 66 is fluidly connected to an air intake 70 that may include one or more intake components (e.g., an air filter, an air cooler, etc.) disposed in an air intake passageway 72. During operation of the engine 50, exhaust gases generated by the engine 50 pass through the exhaust gas passageway 64 and through the turbine 62 to cause the turbine 62 (and the first rotatable shaft 68) to rotate. Rotation of the first rotatable shaft 68 in turn causes the compressor 66 to rotate and draw fresh air through the air intake 70, through the air intake passageway 72, through the compressor 66, and into the intake manifold 56 via a charge air passageway 74. Operation of the turbocharger assembly 60 in this manner increases the flow rate of air into the intake manifold 56 above what it would otherwise be without the turbocharger assembly 60 and the turbocharger assembly 60 supplies so-called "charge" air to the engine 50. A charge air cooler (i.e., an aftercooler) 80 and an air intake throttle 82 are disposed in the charge air passageway 74. The charge air cooler or aftercooler 80 reduces the temperature of the charge air to increase the unit mass per unit volume (i.e., density) of the charge air prior to such charge air being provided to the engine 50 for improved volumetric efficiency thereof. The air intake throttle 82 regulates an amount of compressed charge air supplied to the intake manifold 56.

The compressed charged air allowed to flow through the air intake throttle 82 flows through a main intake 84 of the intake manifold 56. The main intake 84 of the intake manifold 56 is coupled to a plurality of secondary pipes 86 of the intake manifold 56 and each of the secondary pipes 86 is in fluid communication with a corresponding piston-cylinder arrangement 54 to direct a supply a compressed charge air thereto.

The exhaust manifold 58 of the engine system 18 includes a plurality of secondary pipes 88, each of which is in fluid communication with a corresponding piston-cylinder arrangement 54. The plurality of secondary pipes 88 direct exhaust gases generated by the engine 50 to the exhaust gas passageway 64 of the exhaust manifold 58. As described above, the exhaust gas passageway 64 of the exhaust manifold 58 is fluidly coupled to and causes rotation of the turbine 62 of the turbocharger assembly 60 and thereby causes more fresh air to be drawn into the air intake passageway 72. The exhaust gases then exit the turbine 62 and into an aftertreatment system 90 via an aftertreatment passageway 92. The aftertreatment system 90 treats the exhaust gases prior to the treated exhaust gases being vented to the ambient environment via an exhaust outlet 94.

Referring also to FIG. 1, operation of the engine system 18 described above drives a second rotatable shaft 96 of the work vehicle powertrain 19 that is coupled to the wheel(s) 14 of the work vehicle 10 and allows the operator to move the work vehicle 10 as desired.

In addition, one or more of the work components 20*a*, 20*b*, . . . 20*n* of the work vehicle 10 may be coupled to and driven by and/or energized to the operational state by the operation of the engine 50. For example, one or more work components 20 may be mechanically coupled to and driven by a third rotatable shaft 98 coupled to the output shaft of the powertrain 19 and the third rotatable shaft 98 is driven by operation of the piston-cylinder arrangement 54 of the engine 50. In some embodiments, an energizing device 26 of the one or more of the work components 20 may be driven by rotation of the third rotatable shaft 98 by the engine 50 to keep the work component 20 energized to the operational state even when the work component 20 is not being used to avoid any actuation delay when the operator of the work vehicle 10 wishes to operate the implement enabled by the work component 20.

The engine system 18 also includes an electric machine 100 and a battery 102. The electric machine 100 is an electromagnetic system that includes electric rotor (not shown) and a stator (not shown). The rotor of the electric machine 100 is mechanically coupled to a fourth rotatable shaft 103 coupled to the powertrain 19 and driven by the piston-cylinder arrangements 54 of the engine 50. Rotation of the fourth rotatable shaft 103 causes the electric rotor of the electric machine 100 to rotate relative to the stator and thereby generate electric power, which may be used to charge the battery 102. The battery 102 is electrically coupled to the one or more work components 20 of the work vehicle 10 and provides electric power to energize such work component(s) 20 to the operational state.

In some embodiments, as described in greater detail below, when the engine 50 is running but the work vehicle 10 is not being operated to undertake work (i.e., power from the engine 50 is not used to move the work vehicle 10 or operate at least one of the work implements), rotation of the third rotatable shaft 98 by operation of the engine 50 energizes the work component 20 to the operational state when the engine 50 is operating and the battery 102 energizes the work component 20 to the operational state when operation of the engine 50 has been terminated. In other embodiments, the engine 50 is operated to drive the electric machine 100 to charge the battery 102 as necessary and the battery 102 energizes the one or more work components 20 to the operational state both when the engine 50 is operating and when operation of the engine 50 has been terminated.

The aftertreatment system 90 includes a selective catalyst reduction (SCR) catalyst 104 disposed therein. In addition, the aftertreatment system 90 may include one or more additional components or devices that further treat the exhaust gas such as a diesel oxidation catalyst, a diesel particulate filtration (DPF) device, and the like. The SCR catalyst 104 must initially be heated to at least the predetermined activation temperature for the aftertreatment system 90 to effectively process exhaust gases generated by operation of the engine 50. The SCR catalyst 104 remains active as long as the temperature thereof is at least greater than a predetermined minimum active temperature below which effectiveness of the SCR catalyst 104 may be compromised.

The SCR catalyst 104 may be heated by exhaust gases generated by operating the engine 50 that traverse past the SCR catalyst 104 and/or through the aftertreatment system 90. To supplement such heating of the SCR catalyst 104 by the exhaust gases, the engine system 18 includes an electrically powered catalyst heater 106 operable to heat the SCR catalyst 104. In some cases, the catalyst heater 106 is disposed on a metal housing 108 of the aftertreatment system 90 and operated to heat the housing 108, which in turn heats the interior of the aftertreatment system 90

(including the SCR catalyst 104) via conduction and/or convection. In other cases, the catalyst heater 106 is disposed adjacent to or in line with the aftertreatment passageway 92 and heats the exhaust gases that flow through the aftertreatment passageway 92 and into the aftertreatment system 90. The SCR catalyst 104 is thereafter heated by such heated exhaust gases. In still other cases, the catalyst heater 106 is disposed within the aftertreatment system 90 and heats the SCR catalyst 104 directly (for example, by directing thermal energy toward the catalyst). In some embodiments, the catalyst heater 106 may comprise heater elements embedded in the SCR catalyst 104 that can be activated to heat the SCR catalyst 104.

The SCR catalyst 104 of the aftertreatment system 90 may be composed of suitable catalyzing materials, such as platinum, palladium, rhodium, iridium, ceramics, and combinations thereof. Various reductants may be used in conjunction with the SCR catalyst 104, including known nitrogen-bearing reductants such as anhydrous ammonia, aqueous ammonia, and urea. Upon activation by heat as described above, the SCR catalyst 104 facilitates a reaction among the hydrocarbon and NOx components of the exhaust gases generated by the engine 50 and passed through or past the SCR catalyst 104 to breakdown at least some of these components of exhaust gases into water vapor, carbon dioxide, and nitrogen that are exhausted from the exhaust outlet 94.

In some embodiments, rotation of a fifth rotatable shaft 110 by operation of the engine 50 supplies power to the catalyst heater 106 when the engine 50 is operating (either in the idling or the non-idling state) to maintain the temperature of the SCR catalyst 104 in a temperature range necessary for the SCR catalyst 104 to remain activated, and the battery 102 supplies power to the catalyst heater 106 to maintain such temperature of the SCR catalyst 104 when operation of the engine 50 has been terminated. For example, the fifth rotatable shaft 110 may be coupled to an electric machine (not shown) associated with the battery and rotation of the fifth rotatable shaft 110 by the engine 50 causes such electric machine to generate electrical power necessary to operate the catalyst heater 106. In other embodiments, the engine 50 is operated to drive the electric machine 100 to charge the battery 102 when necessary and the battery 102 supplies electric power to the catalyst heater 106 both when the engine 50 is operating and when operation of the engine 50 has been terminated.

Figure 2A:
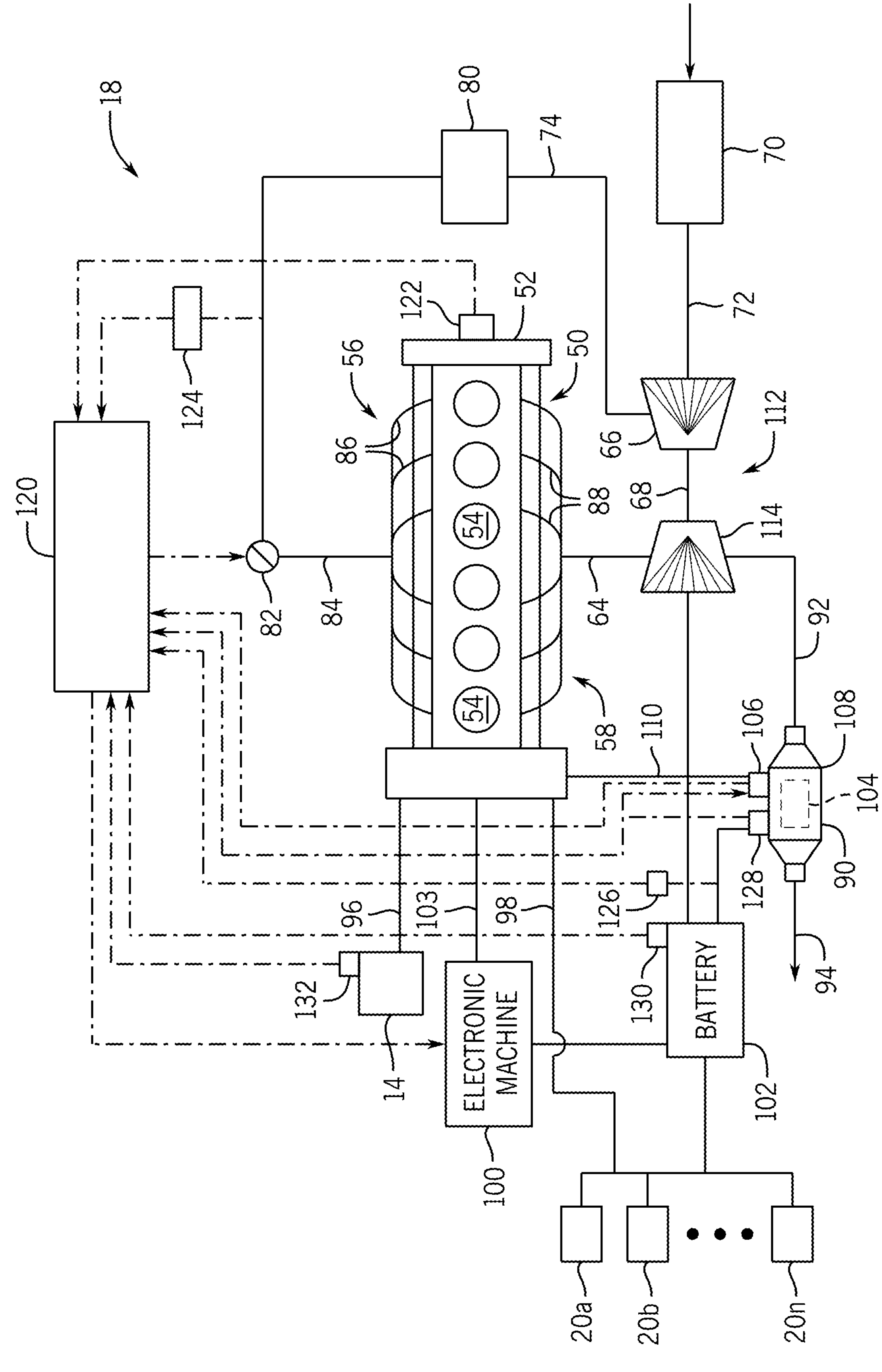
FIG. 2A is a schematic diagram of another example engine system of the work vehicle of FIG. 1.

FIG. 2A shows another embodiment of the engine system 18 that is substantially identical to that shown in FIG. 2 except this embodiment includes an electric turbo 112 instead of the turbocharger assembly 60. The electric turbo 112 includes the compressor 66 and the first rotatable shaft 68 substantially identical to that of the turbocharger assembly 60 and a turbine 114 disposed in the aftertreatment passageway 92 before the aftertreatment system 90. The first rotatable shaft 68 mechanically couples the compressor 66 and the turbine 114 to one another. The electric turbo 112 is an electromagnetic device that includes a rotor (not shown) rotatably coupled to the turbine 114 and a stator (not shown). The electric turbo 112 is operable in a first mode to generate electric power to charge the battery 102 and in a second mode to consume electric power from the battery 102 to supplement spooling of the turbine 114 of the electric turbo 112, e.g., when ignition of the engine 50 is activated. When operated in the first mode, gases generated by the engine 50 that pass through the turbine 114 and cause rotation of the turbine 114 thereof, which in turn causes rotation of the rotor of the electric turbo 112 relative to the stator of the electric turbo 112, and thereby generates electric power that is used to charge the battery 102. When operated in the second mode, the electric turbo 112 draws electric power from the battery 102 to cause rotation of the rotor of the electric turbo 112 and thereby causes the turbine 114 of the electric turbo 112 to rotate. Such rotation of the turbine of the electric turbo 112 rotates the first rotatable shaft 68 to augments the spooling of the turbine 62 caused by the exhaust gases passing therethrough when the engine 50 is operated.

Figure 3:
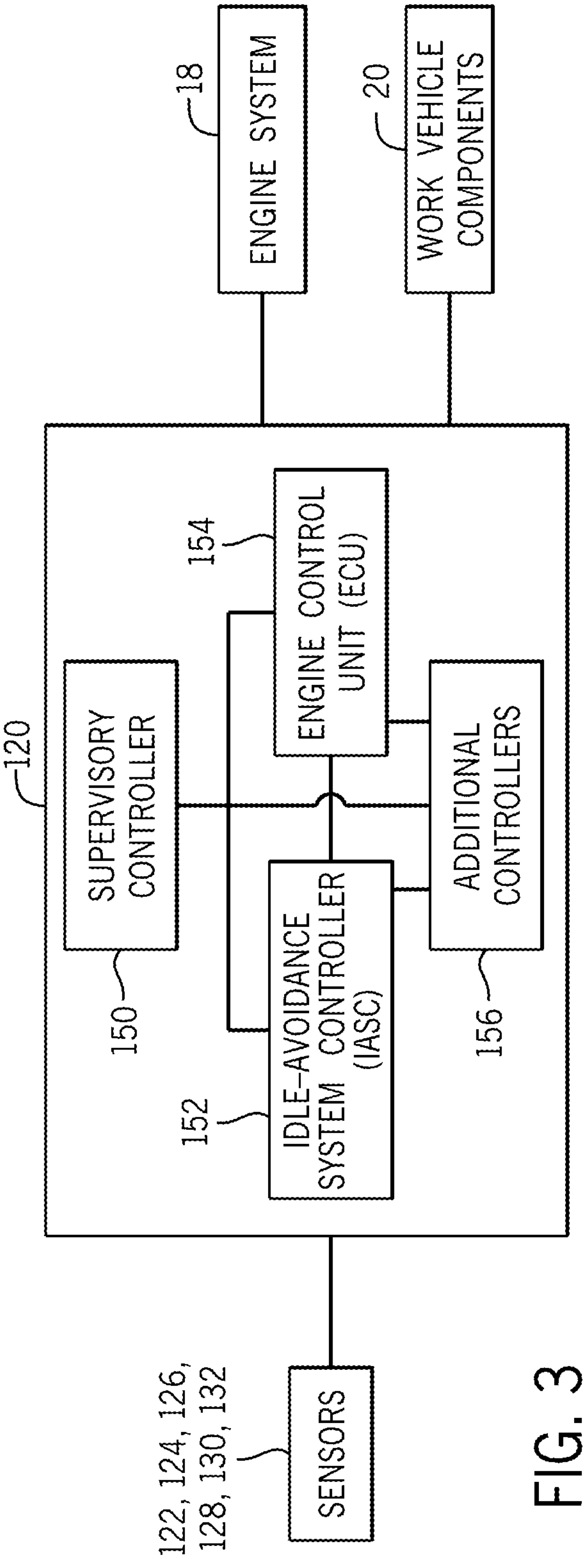
FIG. 3 is a block diagram of a control system of the engine system of FIG. 2 or 2A.

Referring to FIGS. 2, 2A, and 3, the engine system 18 includes a control system 120 and various sensors including: an engine speed sensor 122; one or more sensor(s) 124 disposed in the intake manifold 56 or the air intake passageway 72 that measure one or more of mass airflow, air temperature, and air pressure in the intake manifold 56 and/or air intake passageway 72; one or more sensor(s) 126 in the exhaust manifold 58 that may measure any or all of an oxygen level, temperature, and pressure of exhaust generated by the engine 50; a catalyst temperature sensor 128 that produces a signal and/or data in accordance with a temperature of the SCR catalyst 104; a battery sensor 130 that measures a state of charge of the battery 102; and wheel and or powertrain sensors 132 to determine if power from the engine 50 is being directed by the powertrain 19 to any of the wheels 14 of the work vehicle 10 (i.e., the operator wishes to move the work vehicle 10).

The control system 120 monitors signals or data received from the sensors 122, 124, 126, 128, 130, and 132 described above and adjusts operation of the engine system 18 and the work vehicle components 20 to ensure the work vehicle 10 is able to meet the demands placed on work vehicle 10 by an operator without delay while managing fuel efficiency and reduction of hazardous exhaust gases released to the ambient environment. In particular, the control system 120 includes a supervisory controller 150, an idle-avoidance system controller (IASC) 152 that ensures that work components 20 are energized to the operational state and the aftertreatment system 90 remains activated when the work vehicle 10 is turned on but is not being operated, and an electronic control unit (ECU) 154 that optimizes operation of the engine 50. The control system 120 may also include one or more additional controller(s) 156 such as an operator interface controller, a climate control system, a traction system controller, an accessory and/or hydraulic system controller, a work implement controller, and various others.

The supervisory controller 150 initiates the IASC 152, the ECU 154, and the additional controllers 156 when the work vehicle 10 is started by the operator (e.g., when the operator of the work vehicle 10 actuates an ignition of the vehicle 10), monitors operation of such controllers 152, 154, and 156 during operation of the vehicle 10, and shuts down such controllers 152, 154, and 156 when the operator turns off work vehicle 10. The supervisory controller 150, IASC 152, the ECU 154, and the additional controllers 156 exchange signals and/or data therebetween as necessary to maintain efficient and clean operation of the engine system 18 (and thereby the work vehicle 10).

Figure 3A:
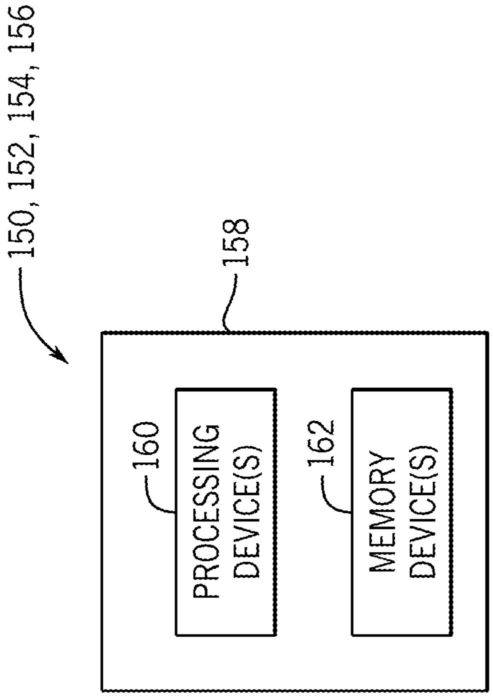
FIG. 3A is a block diagram of a computer-based device that may implement the components of the control system of FIG. 3.

Referring also to FIG. 3A, the supervisory controller 150, the IASC 152, the ECU 154, and the additional controllers 156 may be implemented using hardware, software, firmware, or combinations thereof. In the illustrated embodiment, such components 150, 152, 154, and 156 of the control system 120 may be implemented by one or more suitably programmed computer-based device(s) 158, some or each having a processing device 160 and a memory device 162. The memory device 162 has stored therein, among other things, programming instructions executed by one or more processing devices 160 to cause the controllers 150, 152, 154, and 156 to undertake functions of the engine system 18 as described herein.

Each computer-based device 158 may comprise, e.g., a computer, a device using one or more application specific integrated circuits (ASIC's) and/or field-programmable gate arrays (FPGA's), and/or combinations thereof. Such device 158 may be unitary or may be distributed multiple computing devices, and one or more such computing devices may be installed locally on or remote from the work vehicle 10. Each computer-based device 158 may communicate with another computing device over one or more network(s) such as a local area network (LAN), a control area network (CAN), a cellular network, a wide area network (WAN) such as the Internet, and the like. One or more components 150, 152, 154, and 156 of the control system 120 also may be coupled to and responsive to one or more user device(s) (not shown) such as a keyboard, a mouse, a display, a touch-screen, a joystick, etc. (not shown) via which an operator may monitor and direct operation of the work vehicle 10.

When the work vehicle 10 is initially turned on by the operator, the control system 120 ignites and operates (e.g., via the ECU 154) the engine 50 to energize the work components 20 installed in the work vehicle 10 to the operational state and generate heated exhaust gases to heat the SCR catalyst 104 of the aftertreatment system 90, and to operate the catalyst heater 106. Thermal energy of the exhaust gases generated by operation of the engine 50 and that generated by the catalyst heater 106 rapidly raises the temperature of the SCR catalyst 104 to at least the predetermined activation temperature thereof.

Thereafter, when the work vehicle 10 is being operated (i.e., power from the engine 50 is used to move the work vehicle 10 or operate at least one of the work implements), the control system 120 monitors the data from the catalyst temperature sensor 128 and controls operation of the engine 50 and the catalyst heater 106 to maintain such temperature in a range between a first predetermined temperature and a second predetermined temperature. The first predetermined temperature may be identical to the predetermined activation temperature associated with the SCR catalyst 104 or a few degrees (or a percentage) less than the activation temperature as raising the temperature of the SCR catalyst 104 beyond the first predetermined temperature does not improve the effectiveness of the SCR catalyst 104 substantially and wastes resources (i.e., fuel and battery power). Note, in some embodiments, the control system 120 may raise the temperature of the SCR catalyst 104 to a temperature greater than the activation temperature for a short period of time if the control system 120 determines debris may have contaminated the SCR catalyst 104 that should be burned off.

The second predetermined temperature may be identical to the predetermined minimum temperature noted above or a few degrees (or a percentage of the predetermined minimum temperature) higher than such temperature. Having the second predetermined temperature higher than the predetermined minimum temperature ensures that the temperature of the SCR catalyst 104 does not inadvertently reach a temperature sufficiently low to become deactivated. In some embodiments, the first predetermined temperature is approximately 300 degrees Celsius and the second predetermined temperature is approximately 200 degrees Celsius. It should be apparent to one who has ordinary skill in the art the values of the first and second predetermined temperatures will vary depending on the materials that comprise the SCR catalyst 104.

As discussed above, there may be times when the work vehicle 10 is turned on but the work vehicle 10 is not being operated and thus the engine 50 is operating in an idling state. The IASC 152 monitors the data from the wheel sensors 132 and the additional controllers 156 (e.g., one or more controllers that control operation of the work implement installed in the work vehicle) to determine if the engine 50 is operating in the idling state and if so, manages the amount of the time the engine 50 is operated to energize the work components 20 and maintain activation of the SCR catalyst 104.

In particular, the IASC 152 loads from the memory 162 information regarding the work components 20 that are installed in the work vehicle 10 and that are to be energized to the operational state and a power demand associated with energizing such work components 20 to such state, the first and second predetermined temperatures associated with the SCR catalyst 104, the power demand of the catalyst heater 106 installed in the work vehicle 10, and if the work vehicle 10 includes the electric turbo 112. From such information, the IASC 152 develops an estimate of the power demand necessary to keep the installed work components 20 energized and the SCR catalyst 104 activated. Thereafter, the IASC 152 determines the state of charge of the battery 102 using data from the battery sensor 130. In some embodiments, the state of charge of the battery is represented as a percentage or proportion of the maximum possible charge of the battery that is available to power electric components powered by the battery. In other embodiments, the state of charge of the battery 102 indicates amp-minutes, watt-minutes, and the like of electric energy available in the battery 102.

If the battery 102 has sufficient charge to meet the power demands to energize the work components 20 to the operational state and operate the catalyst heater 106, the IASC 152 directs the ECU 154 to terminate operation of the engine 50. After operation of the engine 50 is terminated, the IASC 152 causes the battery 102 to supply electric power to the work components 20 to energize such components.

In some embodiments, the IASC 152 energizes all of the work components 20 installed in the work vehicle 10 to the operational state. In other embodiments, the operator may indicate one or more work implements are to be used, e.g., by turning on such work implement, and the IASC 152 energizes the work components 20 associated with such work implement.

In addition, the IASC 152 continues to monitor data developed by the catalyst temperature sensor 128 while operation of the engine 50 is terminated to determine the temperature of the SCR catalyst 104. The IASC 152 causes the catalyst heater 106 to operate using electric power supplied by the battery 102 if the determined temperature of the SCR catalyst 104 reaches or approaches the second predetermined temperature below which the SCR catalyst 104 could become deactivated. The catalyst heater 106 is operated until the temperature of the SCR catalyst 104 reaches the first predetermined temperature associated therewith and is then turned off. The catalyst heater 106 remains turned off as long the IASC 152 determines that the temperature of the SCR catalyst 104 is at least at or above the second predetermined temperature.

Further, the IASC 152 continues to monitor data developed by the battery sensor 130 to determine the state of charge of the battery 102. If the IASC 152 determines that the state of charge of the battery 102 is such that the battery 102 cannot continue to supply electric power to meet the estimated power demand necessary to energize the one or more work components 20 to the operational state and continue operation of the catalyst heater 106 if it is turned on, the IASC 152 directs the ECU 154 to ignite activation of the engine 50. In addition, the IASC 152 operates the electronic machine 100 in a power generation mode to convert mechanical power generated by the engine 50 to electric power to charge the battery 102 as described above. In addition, when the engine 50 is activated and operating, the IASC 152 operates the electric turbo 112, if available, to consume battery power to facilitate spooling of the turbine 114 of the electric turbo 112 as described above. After the turbine 114 has spooled to a predetermined rate, the IASC 152 operates the electric turbo 112 in a power generation mode to charge the battery 102.

If the IASC 152 determines that the operator wishes to move the work vehicle or operate at least one work implement, i.e., the engine 50 needs to operate in a non-idling state, the IASC 152 directs the ECU 154 to activate ignition of the engine 50 if operation of the engine 50 has been terminated. The IASC 152 monitors the state of charge of the battery 102 even after the engine 50 is no longer in the idling state and if the engine 50 generates mechanical power in excess of that necessary to meet the power demand of operating the work vehicle 10 as directed by the operator, the IASC 152 directs such excess mechanical power to operate the electric machine 100 in the power generation mode to generate electric power to charge the battery 102. In some embodiments, the IASC 152 computes a difference between the power demand of the work vehicle 10 and the power generated by the engine 50 to determine if excess power is being generated.

Figure 4:
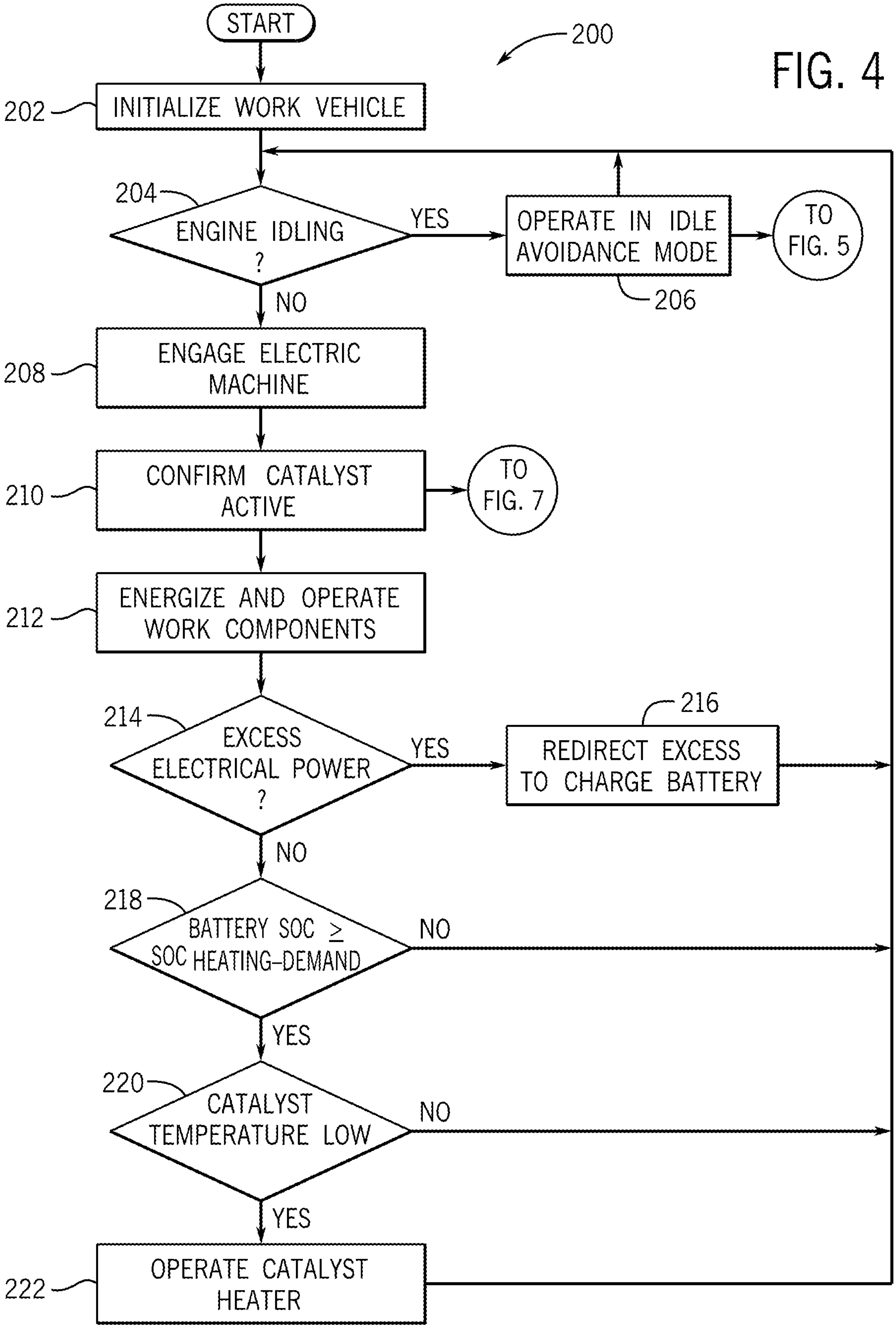
FIG. 4 is a flowchart of processing undertaken by an embodiment of the idle-avoidance system controller of the engine system of FIG. 2 or 2A.

FIG. 4 is a flowchart 200 of operation of the engine system 18. Referring to FIGS. 1-4, at step 202, the supervisory controller 150 detects the operator has turned on the work vehicle 10 and initializes the various components of the work vehicle 10 including the IASC 152, the ECU 154, and the additional controllers 156, and directs the ECU 154 to ignite the engine 50. At step 204, the IASC 152 determines if the engine 50 is operating in the idling state in accordance with data developed by the wheel sensors 132 and/or data provided by the additional controllers 156 associated with the work implements as described above. If the engine 50 is operating in the idling state, the IASC 152 proceeds to step 206 to operate the engine 50 in an idle-avoidance mode as described further below and returns to step 204. Otherwise, the IASC 152 engages the electric machine 100 to operate in a power generation mode at step 208. At step 210, the IASC 152 confirms that the temperature of the SCR catalyst 104 is sufficient for the SCR catalyst 104 to be activated as described in greater detail below. Thereafter, at step 212, the IASC 152 energizes and operates the work components 20 using electric power generated by the electric machine 100. At step 214, the IASC 152 determines if the electric machine 100 is generating power in excess of that needed to energize and operate the work components 20.

If the electric machine 100 is generating excess power, the IASC 152 redirects such excess power to charge the battery 102 at step 216 and returns to step 204. Otherwise, at step 218, the IASC 152 determines if the state of charge (SOC) of the battery is at least at a level $SOC_{heating\text{-}demand}$ or higher. The level $SOC_{heating\text{-}demand}$ is a predetermined minimum state of charge necessary for the battery to augment electric power provided to the catalyst heater 106 by the electric machine 100 to hasten heating of the SCR catalyst 104.

If the SOC of the battery is less than $SOC_{heating\text{-}demand}$, the IASC 152 returns to step 204. Otherwise, at step 220, the IASC 152 determines if the temperature of the SCR catalyst 104 is below the activation temperature of the SCR catalyst 104 if the SCR catalyst 104 has not been activated yet or is at or below the second predetermined temperature associated with the SCR catalyst 104 (i.e., the minimum temperature selected to ensure the SCR catalyst 104 remains activated), and if so, augments heating of the SCR catalyst 104 by activating operation of the catalyst heater 106 to use battery power to generate heat at step 222 and then proceeds to step 204.

Otherwise, if, at step 220, the IASC 152 determines that the SCR catalyst 104 has been activated and the temperature of the SCR catalyst 104 is not at or below the second predetermined temperature, the IASC 152 proceeds to step 204. The IASC 152 operates in this manner until the IASC 152 receives a signal from the supervisory controller 150 that the work vehicle 10 has been turned off.

Figure 5:
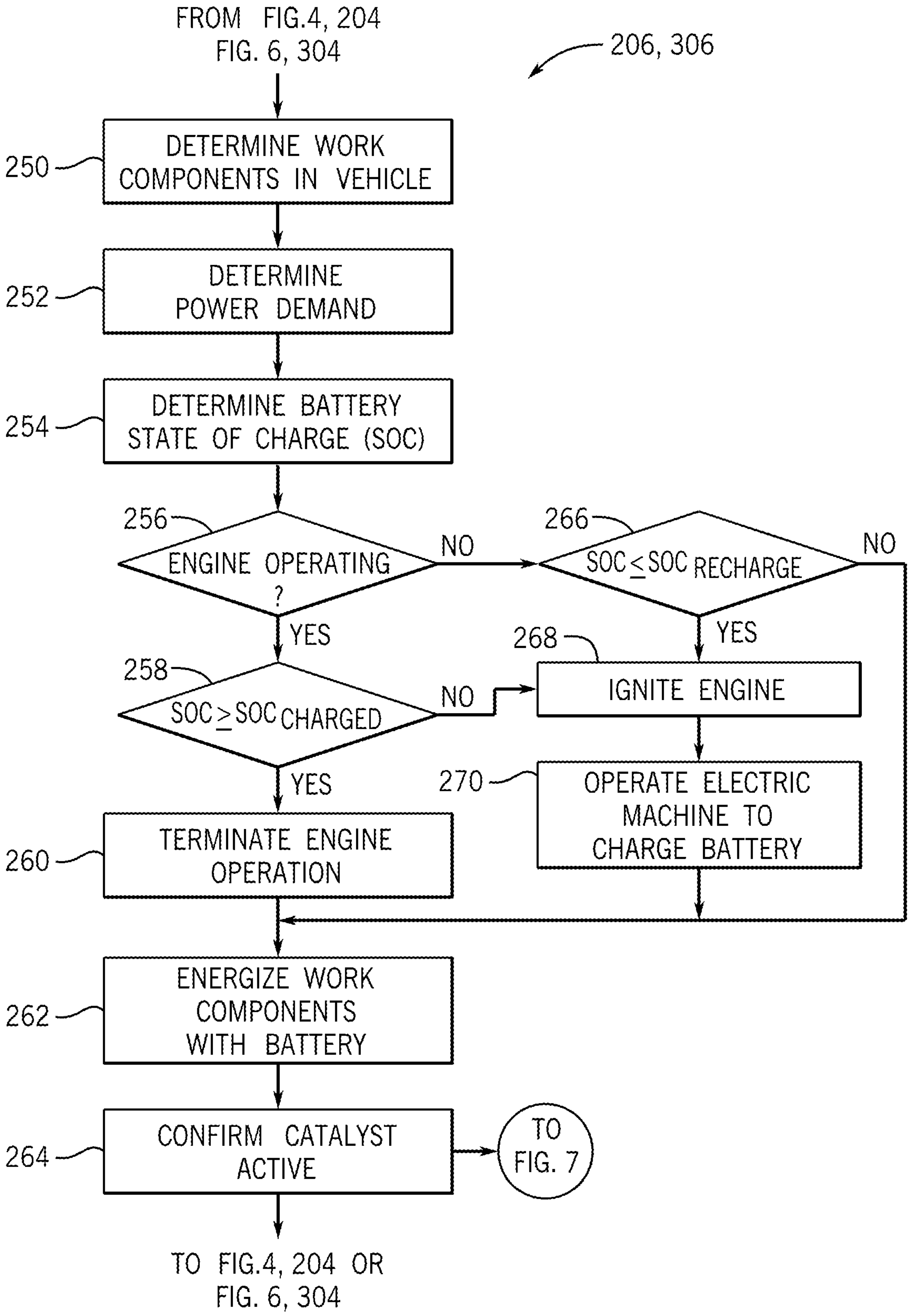
FIG. 5 is a flowchart of processing undertaken by the idle-avoidance controller of FIG. 4 when the engine is operating in an idle-avoidance mode.

FIG. 5 is a flowchart of the steps undertaken by IASC 152 to operate the engine 50 in the idle-avoidance mode. At step 250, the IASC 152 determines the work components 20 in the work vehicle 10 that should be energized even when the engine 50 is idling. In some cases, all of the work components 20 available in the work vehicle 10 are energized to the operational state and in other cases the operator may indicate which work implements are to be used, e.g., by turning one such work implements, and only those work components 20 associated with such work implements will be energized.

At step 252, the IASC 152 determines the power demand necessary to energize the one or more work components 20 to the operational state and operate the catalyst heater 106. At step 254, the IASC 152 determines the SOC of the battery 102 and, at step 256, the IASC 152 checks if the engine 50 is operating. If the engine 50 is operating, then, at step 258, the IASC 152 determines if the SOC of the battery 102 is at least an amount $SOC_{charged}$ that is necessary for the battery 102 to meet the power demand to energize the work components 20 to the operational state and to operate the catalyst heater 106. If the SOC of the battery is at least $SOC_{charged}$, the IASC 152 directs the ECU 154 to terminate operation of the engine 50 at step 260.

Thereafter, at step 262, the work components 20 are energized using electric power supplied by the battery 102. At step 264, the IASC 152 confirms that the temperature of the SCR catalyst 104 is sufficient to maintain activation of the SCR catalyst 104 and then returns to step 204 to determine if the engine 50 is still operating in the idling state.

If at step 258, the IASC 152 determines the SOC of the battery is not at least $SOC_{charged}$, the IASC 152 directs the ECU 154 to activate ignition of the engine 50 at step 268 and operates the electric machine 100 in the power generation mode to charge the battery 102 at step 270. After step 270, the IASC 152 proceeds to step 262.

7 If, at step 256, the IASC 152 determines the engine 50 is not operating (i.e., the operation of the engine 50 was previously terminated), the IASC 152 determines if the SOC of the battery is less than or equal to a predetermined amount $SOC_{recharge}$ at step 266. If so, the IASC 152 proceeds to step 268, otherwise the IASC 152 proceeds to step 262 described above. The IASC 152 directs the ECU 154 to activate ignition of the engine 50 at step 268, operates the electric machine 100 in the power generation mode to recharge the battery 102 at step 270, and thereafter proceeds to step 262 described above. The amount $SOC_{recharge}$ is a level of charge at which the battery 102 may not be able to continue to supply electric power to meet the power demand to energize the one or more of the work components to an operational state and support operation of the catalyst heater 106 and should be recharged. In some embodiments, the amount $SOC_{recharge}$ is approximately 40% and the amount $SOC_{charged}$ is approximately 80%. In some cases, the amount $SOC_{recharge}$ is approximately 20%, which is an SOC when the battery 102 must be charged but the IASC 152 may initiate recharging of the battery 102 if the SOC of the battery 102 falls below 40% and the power demand warrants such recharging.

Figure 6:
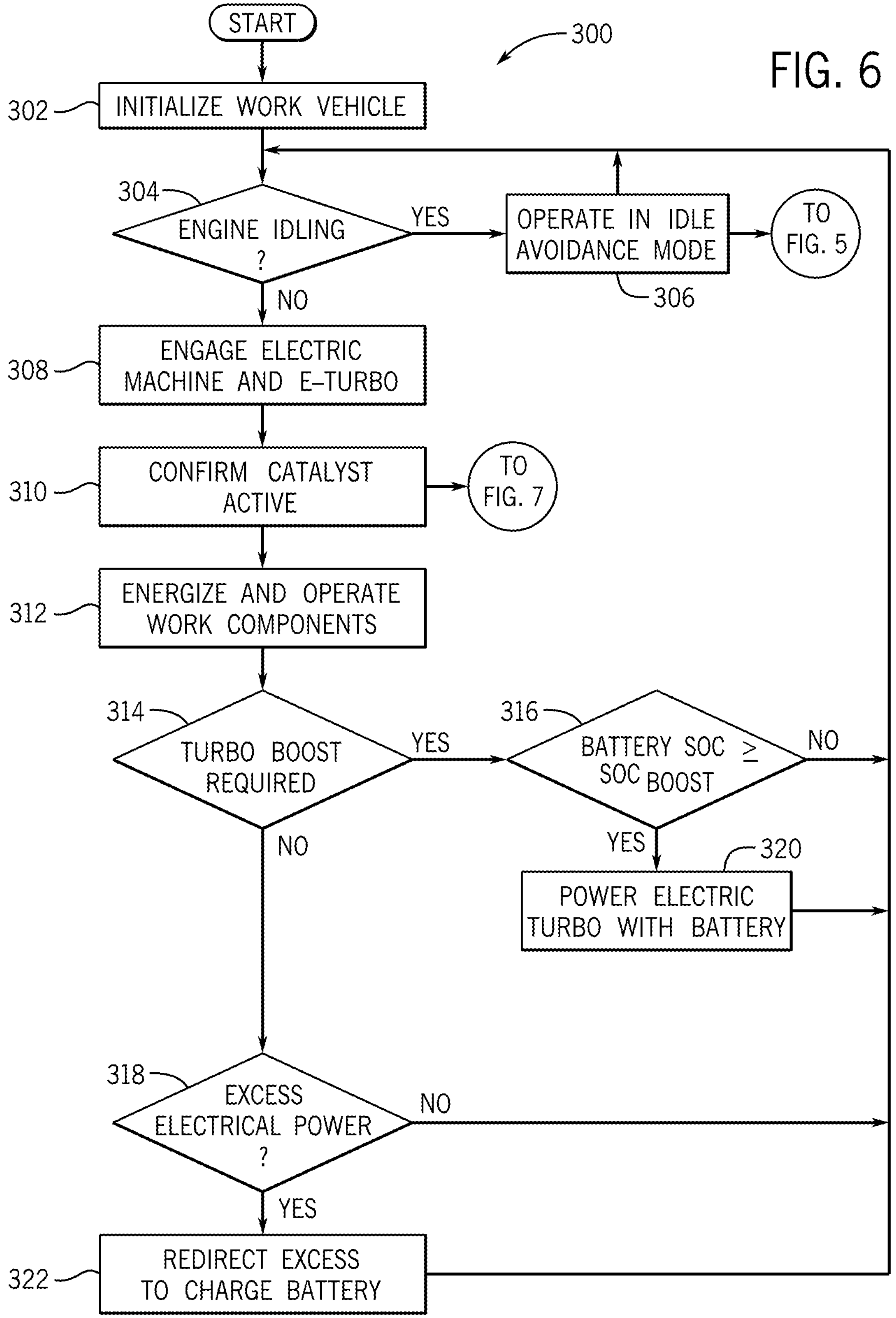
FIG. 6 is a flowchart of processing undertaken by another embodiment of the idle avoidance system controller of the engine system of FIG. 2 or 2A.

FIG. 6 is a flowchart 300 of operation of another embodiment of the engine system 18. At step 302, the supervisory controller 150 detects the operator has turned on the work vehicle 10 and initializes various components of the work vehicle 10 including the IASC 152, the ECU 154, and the additional controllers 156, and directs the ECU 154 to ignite the engine 50. At step 304, the IASC 152 determines if the engine 50 is idling and if so, the operates the engine 50 in the idle avoidance mode at step 306 described above in connection with step 206 of FIG. 4 and then returns to step 304.

Otherwise, at step 308, the IASC 152 engages the electric machine 100 and the electric turbo 112 with the engine 50 to operate both in power generation modes. At step 310, the IASC 152 confirms the SCR catalyst 104 has been activated and is at a temperature to remain active as described below.

At step 312, the IASC 152 energizes and operates the one or more work components 20 using electric power generated by the electric machine 100 and/or the electric turbo 112. In some embodiments, the IASC 152 directs electric power generated by the electric machine 100 to energize and operate the one or more work components 20 and electric power generated by the electric turbo 112 to charge the battery 102. In other embodiments, the IASC 152 directs electric power generated by both the electric machine 100 and by the electric turbo 112 to energize and operate the one or more work components 20.

At step 314, the IASC 152 determines if a boost should be provided to the turbine 114 of the electric turbo 112 to augment spooling thereof and if so proceeds to step 316. Otherwise, the IASC 152 proceeds to step 318. At step 316, the IASC 152 determines if the SOC of the battery is at least at a level SOCboost that is sufficient to drive the electric turbo 112 to augment spooling the turbine 114 thereof. If the SOC of the battery is not at least at the level SOCboost, the IASC 152 returns to step 304. Otherwise, the IASC 152, at step 320, stops operating the electric turbo 112 in the power generation mode and operates the electric turbo 112 in the power consumption mode to use electric power from the battery 102 to spin and augment spooling of the turbine 114. In some embodiments, the level SOCboost is approximately 40%.

At step 318, the IASC 152 determines if any excess electric power is generated by the electric machine 100 and/or the electric turbo 112 and if excess power is not being generated returns to step 304. Otherwise, the IASC 152 redirects such excess electric power to charge the battery at step 322 and then returns to step 304.

Figure 7:
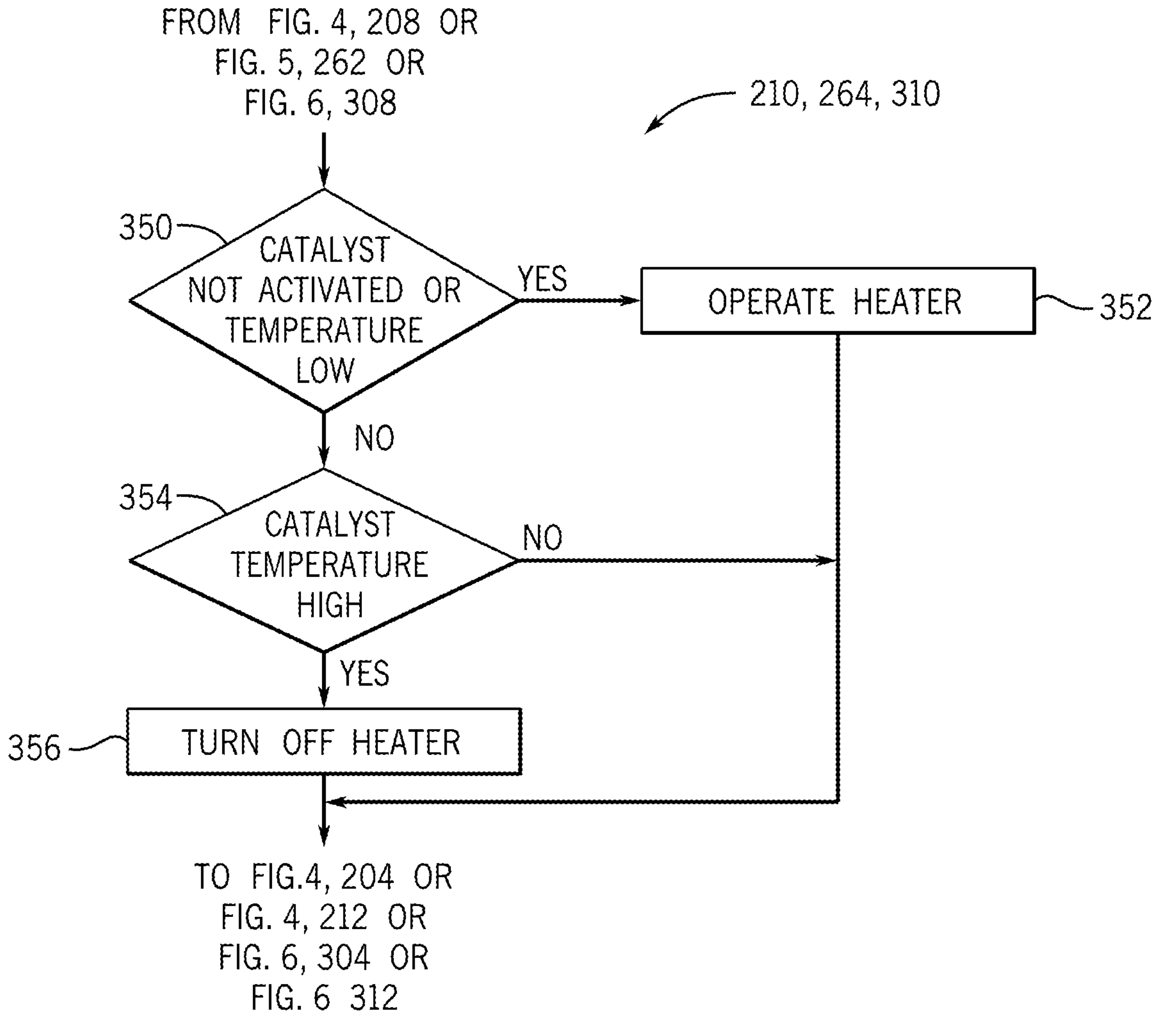
FIG. 7 is a flowchart of processing undertaken by the idle avoidance system controller of FIG. 5 or FIG. 6 to maintain a temperature of a catalyst of an aftertreatment system of the engine system of FIG. 2 or 2A.

FIG. 7 is a flowchart of the steps undertaken by the IASC 152 at steps 210 (FIG. 4), 264 (FIG. 5), or 310 (FIG. 6) to confirm the temperature of the SCR catalyst 104 is sufficient for the catalyst to be activated. At step 350, the IASC 152 determines if the SCR catalyst 104 needs to be activated (i.e., the SCR catalyst 104 has not been heated to the predetermined activation temperature described above) or if the temperature of the SCR catalyst 104 is at or less than the second predetermined temperature discussed above. If so, the IASC 152 operates the catalyst heater 106 at step 352 and proceeds to step 204 (FIG. 4), 212 (FIG. 4), 304 (FIG. 6), or 312 (FIG. 6), as appropriate. In some embodiments, IASC 152 also determines if the engine is operating at step 352 and in such cases directs the ECU 154 to temporarily operate the engine 50 at a higher temperature (e.g., by adjusting the air-fuel mixture or exhaust throttle) to generate heated exhaust gases that may facilitate rapid heating of the SCR catalyst 104. If at step 350 the IASC 152 determines that the temperature of the SCR catalyst is above the second predetermined temperature, the IASC 152 proceeds to step 354 and determines if the temperature of the SCR catalyst 104 is at least the first predetermined temperature discussed above. If the temperature of the SCR catalyst 104 is not at least the first predetermined temperature, the IASC 152 returns to step 204 (FIG. 4), 212 (FIG. 4), 304 (FIG. 6), or 312 (FIG. 6), as appropriate. Otherwise, the IASC 152 terminates operation of the catalyst heater 106 if it is operating at step 356 and then returns to step 204 (FIG. 4), 212 (FIG. 4), 304 (FIG. 6), or 312 (FIG. 6), as appropriate.

Although the embodiments disclosed herein are described in connection with a vehicle having a diesel engine system, it should be apparent to one who has ordinary skill in the art that aspects of these embodiments may be adapted to other types of work vehicles having other types of engines to manage operation of the engine when such engine is in an idling state. Further, aspects of such embodiments may even be used in other types of engines or motors not associated with vehicles as appropriate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Accordingly, various embodiments and implementations other than those explicitly described are within the scope of the following claims.

What is claimed is:

1. An idle-avoidance system for a work vehicle having an engine and one or more work components, the system comprising:

an electric machine coupled to and driven by the engine;

a battery coupled to the engine, the electric machine, and the one or more work components;

an electric turbo driven by exhaust generated by operation of the engine; and a controller having a processing and memory architecture and configured to execute instructions to determine whether the engine is in an idling state and in response:

estimate a power demand associated with energizing at least one of the one or more work components to an operational state;

monitor a state of charge of the battery;

terminate operation of the engine when the state of charge of the battery is sufficient to meet the estimated power demand;

activate ignition of the engine and operation of the electric machine in a power generation mode to charge the battery when the state of charge of the battery is not sufficient to meet the estimated power demand; and operate the electric turbo in a power generation mode to charge the battery while the engine is activated.

2. The idle-avoidance system of claim 1, wherein the engine is a compression ignition engine.

3. The idle avoidance system of claim 1, wherein the at least one of the one or more work components is mechanically coupled to the engine and electrically coupled to the battery and is energized to the operational state mechanically by the operation of the engine when the engine is activated and electrically by the battery when the operation of the engine is terminated.

4. The idle avoidance system of claim 1, wherein the battery supplies power to energize the at least one of the one or more work components to the operational state while the engine drives the electric machine to charge the battery.

5. The idle avoidance system of claim 1, wherein the controller determines the engine has transitioned from the idling state to a non-idling state, and in response causes the electric turbo to operate in a battery power consumption mode to spool up the electric turbo using battery power and thereby provide compressed air to the engine.

6. The idle avoidance system of claim 1, wherein the work vehicle includes an aftertreatment system having a catalyst, an electrically powered heater, and a temperature sensor that develops an indication of a temperature of the catalyst, and the controller monitors the indication of the temperature while the operation of the engine is terminated and powers the heater using power from the battery if the indication is less than a predetermined temperature and the state of charge of the battery is sufficient to power the heater.

7. The idle avoidance system of claim 6, wherein the controller activates ignition of the engine and operates the engine to generate heated exhaust gases that heat the catalyst if the indication is less than the predetermined temperature and the state of charge of the battery is not sufficient to power the heater.

8. The engine system of claim 1, further comprising an aftertreatment system, an electrically powered heater, and a temperature sensor, wherein the temperature sensor develops an indication of a temperature of the catalyst, the controller monitors the indication of the temperature while the engine is turned off, and operates the heater using power from the battery if the indication is less than a predetermined temperature and the state of charge of the battery is sufficient to power the heater.

9. The engine system of claim 8, wherein the controller activates ignition of the engine and operates the engine to generate heated exhaust gases that heat the catalyst if the indication is less than the predetermined temperature and the state of charge of the battery is not sufficient to power the heater.

10. An idle-avoidance system for a work vehicle having an engine and one or more work components, the system comprising:

an electric machine coupled to and driven by the engine;

a battery coupled to the engine, the electric machine, and the one or more work components; and a controller having a processing and memory architecture and configured to execute instructions to determine whether the engine is in an idling state and in response:

estimate a power demand associated with energizing at least one of the one or more work components to an operational state;

monitor a state of charge of the battery;

terminate operation of the engine when the state of charge of the battery is sufficient to meet the estimated power demand; and activate ignition of the engine and operation of the electric machine in a power generation mode to charge the battery when the state of charge of the battery is not sufficient to meet the estimated power demand;

wherein the controller determines the engine has transitioned from the idling state to a non-idling state and in response causes the engine to drive the electric machine to provide electric power to the at least one of the one or more work components; and wherein the controller determines that electric power generated by the electric machine exceeds a power demand of the at least one of the one or more work components and directs excess electric power generated by the electric machine to charge the battery.

11. An engine system for a work vehicle having one or more work components, the system comprising:

an engine;

an electric machine coupled to and driven by the engine;

a battery coupled to the engine, the electric machine, and the one or more work components;

an electric turbo driven by exhaust generated by operation of the engine; and an idle avoidance system comprising a controller having a processing and memory architecture and configured to execute instructions to determine whether the engine is in an idling state and in response:

estimate a power demand associated with energizing at least one of the one or more work components to an operational state;

monitor a state of charge of the battery;

terminate operation of the engine when the state of charge of the battery is sufficient to meet the estimated power demand;

activate ignition of the engine and operation of the electric machine in a power generation mode to charge the battery when the state of charge of the battery is not sufficient to meet the estimated power demand; and operate the electric turbo in a power generation mode to charge the battery while the engine is activated.

12. The engine system of claim 11, wherein the engine is a compression ignition engine.

13. The engine system of claim 11, wherein the at least one of the one or more work components is mechanically coupled to the engine and electrically coupled to the battery and is energized to the operational state mechanically by operation of the engine when the engine is activated and electrically by the battery when operation of the engine is terminated.

14. The engine system of claim 11, wherein the battery supplies power to energize the at least one of the one or more work components to the operational state while the engine drives the electric machine to charge the battery.

15. The engine system of claim 11, wherein the controller determines the engine has transitioned from the idling state to a non-idling state, and in response causes the electric turbo to operate in a battery power consumption mode to spool up the electric turbo using battery power and thereby provide compressed air to the engine.

16. An engine system for a work vehicle having one or more work components, the system comprising:

an engine;

an electric machine coupled to and driven by the engine;

a battery coupled to the engine, the electric machine, and the one or more work components; and an idle avoidance system comprising a controller having a processing and memory architecture and configured to execute instructions to determine whether the engine is in an idling state and in response:

estimate a power demand associated with energizing at least one of the one or more work components to an operational state;

monitor a state of charge of the battery;

terminate operation of the engine when the state of charge of the battery is sufficient to meet the estimated power demand; and activate ignition of the engine and operation of the electric machine in a power generation mode to charge the battery when the state of charge of the battery is not sufficient to meet the estimated power demand;

wherein the controller determines the engine has transitioned from the idling state to a non-idling state and in response causes the engine to drive the electric machine to provide electric power to at least one of the one or more work components; and wherein the controller determines that electric power generated by the electric machine exceeds a power demand of the at least one of the one or more work components and directs excess electric power generated by the electric machine to charge the battery.

* * * * *